United States Patent
Gorodisher et al.

(10) Patent No.: US 8,662,682 B2
(45) Date of Patent: Mar. 4, 2014

(54) MAGNETICALLY REPOSITIONABLE REFLECTIVE SAFETY DEVICES

(76) Inventors: Susanna Sidoti Gorodisher, Stillwater, MN (US); Ilya Gorodisher, Stillwater, MN (US)

(*) Notice: Subject to any disclaimer, the term of this patent is extended or adjusted under 35 U.S.C. 154(b) by 399 days.

(21) Appl. No.: 12/290,793

(22) Filed: Nov. 4, 2008

(65) Prior Publication Data
US 2010/0110544 A1 May 6, 2010

(51) Int. Cl.
*G02B 5/12* (2006.01)

(52) U.S. Cl.
USPC ........................................ 359/519

(58) Field of Classification Search
USPC .......... 359/515–553; 248/682, 683, 466–467, 248/537, 206.5, 309.4
See application file for complete search history.

(56) References Cited

U.S. PATENT DOCUMENTS

| | | | |
|---|---|---|---|
| 4,145,112 A * | 3/1979 | Crone et al. | 359/531 |
| 4,943,139 A * | 7/1990 | Bacon et al. | 359/538 |
| 5,450,658 A | 9/1995 | Hicks | |
| 5,682,653 A * | 11/1997 | Berglof et al. | 24/303 |
| 5,926,925 A | 7/1999 | Hicks | |
| 6,027,227 A | 2/2000 | Tang | |
| 6,226,842 B1 | 5/2001 | Wong | |
| 6,446,571 B1 | 9/2002 | Sloot | |
| 6,656,566 B1 | 12/2003 | Kuykendall et al. | |
| 6,834,395 B2 | 12/2004 | Fuentes | |
| 6,883,921 B2 * | 4/2005 | Mimura et al. | 359/529 |
| 6,964,493 B1 | 11/2005 | Whitlock | |
| 7,377,663 B2 | 5/2008 | Desjardin | |
| 7,425,075 B1 * | 9/2008 | Hubbell | 359/530 |
| 2007/0195414 A1 * | 8/2007 | Segura Lopez De Dicastillo | 359/516 |
| 2009/0122405 A1 * | 5/2009 | Mimura | 359/530 |

* cited by examiner

*Primary Examiner* — Jennifer L. Doak
(74) *Attorney, Agent, or Firm* — Kagan Binder, PLLC

(57) ABSTRACT

The present invention provides a magnetically repositionable reflective device for enhancing the visibility of objects, persons and pets, especially in low light environments. The device comprises a magnetically responsive element within a reflective sheath.

11 Claims, 2 Drawing Sheets

MAGNETICALLY REPOSITIONABLE REFLECTIVE SAFETY DEVICES

FIELD

This invention relates to reflective safety devices, including magnetically repositionable reflective safety devices and to methods of using them.

BACKGROUND

Nighttime and daytime conspicuity are vital to the safety of adults, children and their pets. Vehicles, including land and water vehicles, pedestrians, joggers, bikers and other sportsmen as well as pets need to be readily visible, especially under poor and/or low light conditions and in the darkness in order to avoid dangerous collisions. Certain occupations, such as traffic controllers, crossing guards, students, pedestrians and joggers, etc., need to be seen by the oncoming vehicles in the absence of good ambient lighting.

Traditionally conspicuity has been accomplished in two major ways: either via active illumination devices or via passive light management. Active illumination requires several key components: a power source, circuitry, light-emitting device(s) and a method of attachment or incorporation of the apparatus onto the substrate of the person, animal or item to be rendered more visible. Such approaches are outlined, for example in U.S. Pat. No. 6,964,493, U.S. Pat. No. 6,027,227, U.S. Pat. No. 7,377,663 and U.S. Pat. No. 6,834,395. These approaches are expensive and produce a cumbersome device that requires periodic servicing of its many parts, including replacement of the power source.

Passive light management is based on the principles of retroreflection. In this approach, incident light is manipulated so as to return its maximum intensity back to the source of the illumination. This is the principle behind reflective sheeting products found on, for example, road and traffic signs as well as protective gear, such as safety vests, firefighter's garments and vehicle safety devices, especially such as those deployed on school buses, slow moving vehicles, trucks, emergency response transport vehicles, etc. Passive light management as disclosed in, for example U.S. Pat. No. 6,446,571, and U.S. Pat. No. 6,656,566, is attractive because it has no moving parts or devices with components that periodically need to be serviced. However, even the passive light management approach, though less problematic than the active light management approach, leads to expensive products, such as safety garments and similar protective gear and object demarcation safety devices.

A key drawback of the passive light management approach is the permanent attachment of the reflective element to the item that needs to be highlighted for safety. Currently the reflective element is optionally sewn on the item, permanently adhered onto it via "iron on" (hot melt) adhesive, or attached to the item via some other semi-permanent or permanent adhesive.

Generally, when an adhesive is used to secure the reflective safety element to the item, a pressure sensitive adhesive (PSA) is used. This may or may not allow the reflective element to be repositionable. Alternatively, Velcro® Fasteners, or another hook and loop fastener or other type of mechanical method is used to provide the feature of detachability and reattach-ability to the reflective element. However, these types of fastening means either have to be permanently attached to both the article and the reflective element, or temporarily affixed employing, for example, a PSA.

A disadvantage to the use such an attachment method is the potential damage to the surface upon repositioning due to the adhesive residue left behind. Another disadvantage is the requirement of having an essentially flat, non-textured surface for adequate attachment. The PSA approach has a further disadvantage in that it allows for only a limited number of uses because the adhesive becomes contaminated or otherwise damaged after just a few uses, thereby rendering the reflective element ineffective for long-term reuse. Still another disadvantage is that the use of a PSA attachment is often limited to indoor applications because many PSAs are not weather resistant and therefore not suitable for outdoor use.

Even though the use of magnetic attachment has been disclosed, see U.S. Pat. No. 6,446,571, PSAs are employed to attach the magnet to the reflective element. Consequently, this patent does not entirely overcome the disadvantages discussed above.

Another approach is disclosed in U.S. Pat. No. 6,027,227 which discloses a foldable tarp with a plurality of active light emitting devices mechanically mounted onto retroreflective strips. The complex circuitry and the aforementioned power source requirement render the objects of the '227 unusable as magnetically repositionable reflective safety devices.

SUMMARY

The present invention overcomes the above-discussed disadvantages of the prior art.

In one embodiment, the present invention provides a magnetically repositionable reflective safety device comprising a magnetically responsive material encapsulated within a sheath, wherein the sheath comprises a first reflective surface and a second surface.

In another embodiment, the present invention provides a magnetically repositionable reflective safety device comprising first and second magnetically attractable ends, each having opposed surfaces, and a non-magnetic flexible bridge connecting the first and second ends, wherein each of the first and second ends comprises a magnetically responsive material encapsulated within a non-magnetic sheath, the non-magnetic sheath having at least one reflective surface;

the magnetically responsive material of at least one of the first and second ends comprises at least one magnet; and the magnetically responsive material of the other of the first and second ends comprises at least one magnet or at least one magnetizable element.

BRIEF DESCRIPTION OF THE DRAWING(S)

The accompanying drawings depict various embodiments of the present invention. These embodiments are representative of the various embodiments of the invention as will be understood by those skilled in the art. In these figures, like reference numbers refer to the same elements throughout the various views. In these drawings.

DETAILED DESCRIPTION

Figure 1:
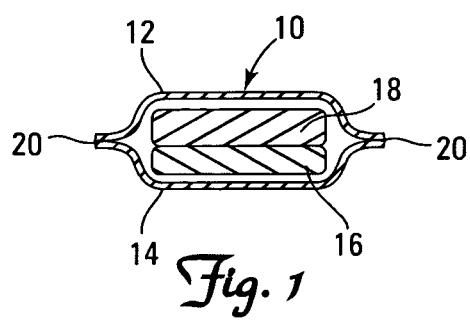
FIGS. 1-3B are cross sectional views of various embodiments of the invention in which the device comprises a single safety device.

The article of the present invention comprises a magnetically repositionable passive light management device that shields the magnet from the [natural] elements. Such magnetically repositionable reflective devices provide great versatility in their applications. They can be employed to highlight moving vehicles, such as, for example, cars, trucks and boats, as well as stationary objects, such as mailboxes and docks. They may also be used to draw attention to humans via attachment of the magnetically repositionable safety device to articles of clothing and accessories, and to pets via attachment, for example, to the pet collars and harnesses.

The safety device of the present invention may be attached in a repositionable manner to a variety of substrates via magnetic means. The magnetic attachment can be accomplished in a variety of ways, depending on the nature of the object onto which the safety device is placed.

The reflective safety device of the invention may be attached directly onto ferromagnetic (or magnetic) substrate, such as a car, truck or similar vehicle as a unitary article. Alternatively, it may be attached to non-ferromagnetic substrates made of fabric, cloth, film or sheets, such as clothing and garments, including the outerwear, backpacks. Typically in this application, the reflective safety device of the invention may be provided with a second component or backing that may comprise a ferromagnetic or magnetic plate, that may optionally be enclosed, and preferably sealed, in, for example, a polymeric material. The provided backing unit may be either physically attached to the safety device via a flexible, semi-rigid or otherwise bendable bridge or, optionally, it may be provided as an independent detached and separate piece.

The safety device of the invention is extraordinarily versatile. For example, a single device may be used on either a ferromagnetic surface or a non-ferromagnetic surface. Thus, a single device according to the invention may be used on an automobile to enhance its visibility. The same device may then be removed and placed on an article of clothing or a backpack to enhance the visibility of the wearer or the user. Additionally, the sheath of the device may be of the type that allows the magnetic element to be removed. This permits the user to change the sheath for any number of reasons including laundering the sheath, replacing the sheath, changing the sheath for fashion purposes, etc.

The sheath may comprise an open or reclosable pocket. Typically, the opening is provided on the obverse side of the reflective sheeting used to provide the reflective surface, so that a magnet or magnets encased in their own protective enclosure(s) can be retrievably placed into said pouch on the back side of the reflective sheeting.

The reflective magnetically repositionable safety devices disclosed herein furthermore may be rendered flexible, semi-rigid or rigid by providing an inner stiffening layer or layers in the sheath. The stiffening layer may be made of any number of materials, including, but not limited to, plastics, cardboard, metal or wood or any combination thereof. Various embodiments of the present invention employing such stiffening layers preferably position such layers immediately adjacent to and behind the reflective sheeting layer, so as to minimize the magnetic insulation (low magnetic permeability layer thickness) between the encapsulated magnet(s) and the backing plate or other ferromagnetic or magnetic substrates onto which said safety devices are magnetically attached.

For improved daytime conspicuity fluorescent reflective sheeting may be employed as the reflective layer for the device. Fluorescence may be achieved by incorporating fluorescent dyes and/or pigments into the reflective sheeting. The fluorescent dyes and pigments drastically improve visibility in traffic, as evidenced by the number of fluorescent green school crossing signs and fluorescent orange construction work signs currently in use.

The articles of the present invention may be manufactured in a variety of ways. For example, the magnetic element(s) (magnet(s) or ferromagnetic material or any combination thereof) may be, and preferably is, encapsulated in any number of thermoplastic or thermosetting polymeric materials and resins, including and not limited to polymers or copolymers of polyvinyl chloride, polyethylene, polypropylene, nylons (polyamides), polyesters, polyvinyl acetates, cellulose, (meth)acrylate(s), polyurethanes, epoxides, phenol formaldehyde resins, butadienes, siloxanes and similar elastomers and other polymeric materials familiar to those skilled in the art.

The encapsulation may be accomplished via a variety of methods, including, but not limited to high frequency or thermal sealing, esp. for PVC and polyurethanes, ultrasonic sealing, molding (including injection molding, reaction injection molding and related). The encapsulation may also be provided for via encasing the magnetic element in a monomeric or oligomeric resin and providing for a polymerization mechanism via thermal or irradiative catalysis/initiation or some combination thereof.

The magnetic element assembly thus produced may be attached to the reflective sheeting layer either simultaneously with the encapsulation step or sequentially thereafter using any number of attachment techniques, including, but not limited to adhesive methods, sewing, radio frequency heat sealing and other methods apparent to those skilled in the art. The manner of such attachment of the magnetic element to the reflective layer may be either permanent in nature or reversible.

In case of reversible attachment, the encapsulated magnetic element assembly or simply the magnetic element may, for example, be placed into an open, optionally reclosable pouch attached to the back of the reflective layer assembly. In the case of permanent attachment, the magnetic element(s) or assembly may be attached onto the back of the reflective layer assembly using any number of known attachment methods described in the previous paragraph.

The present invention will be further discussed with respect to the illustrative embodiments shown in the several Figures.

Referring now specifically to FIG. 1, a first embodiment of the invention is shown that comprises a sheath 10 comprising a reflective sheet 12, a second sheet 14, a magnetically responsive material 16, and an optional stiffener 18. Reflective sheet 12 and second sheet 14 are joined together at seam 20 to form a pouch that encapsulates the magnetically responsive element 16 and the stiffener 18. Second sheet 14 may be reflective if desired.

Figure 2:
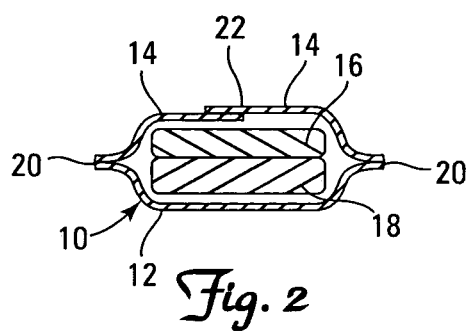

FIG. 2 shows a second embodiment of the invention. Like the embodiment shown in FIG. 1, this embodiment comprises a sheath 10 having a reflective sheet 12, a second sheet 14, a magnetically responsive element 16, and an optional stiffener 16. The reflective sheet 12 and the second sheet 14 are joined together at seam 20 to form a pouch that encapsulates the magnetically responsive element 16 and the stiffener 18. Optionally, the magnetically responsive element 16, and the optional stiffener 18, may be hermetically sealed into pouch 15 (See FIG. 3B). Unlike the embodiment of FIG. 1, the second sheet 14 comprises two sections joined at joint 22. The two sections of sheet 14 may be permanently joined to one another at joint 22. Alternatively, the two sections of sheet 14 may be joined to one another so that the pouch may be repeatedly opened and closed, thereby allowing the magnetically responsive element and the optional stiffener to be removed and/or replaced.

Figure 3A:
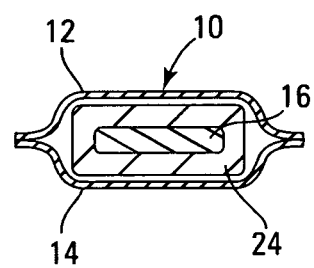
Figure 3B:
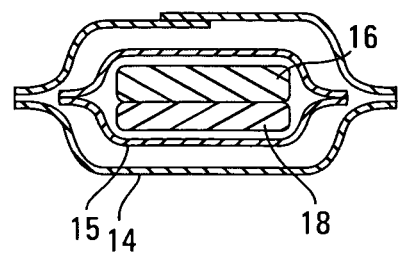

FIG. 3 shows a third embodiment of the invention in which the magnetically responsive element 16 is hermetically encapsulated in a shell 24. In this embodiment, the shell 24 surrounds and is in total contact with the magnetically responsive element. The combination of magnetically responsive element 16 and shell 24 is further encapsulated in sheath 10.

Figure 4:
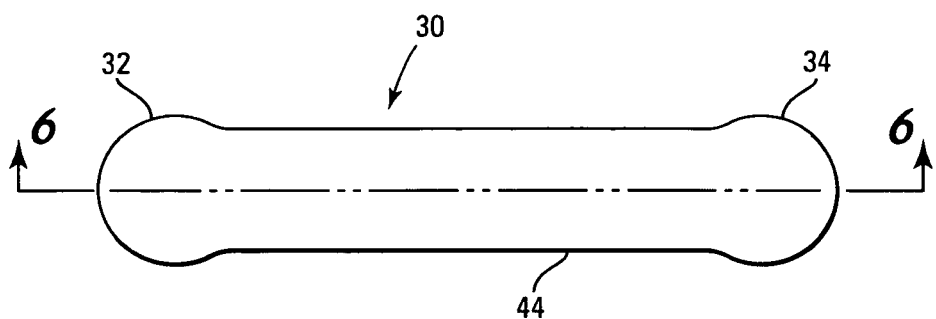
FIG. 4 is a schematic plan view of another embodiment of the invention having opposed magnetically attractable ends joined by a bridge.
Figure 5:
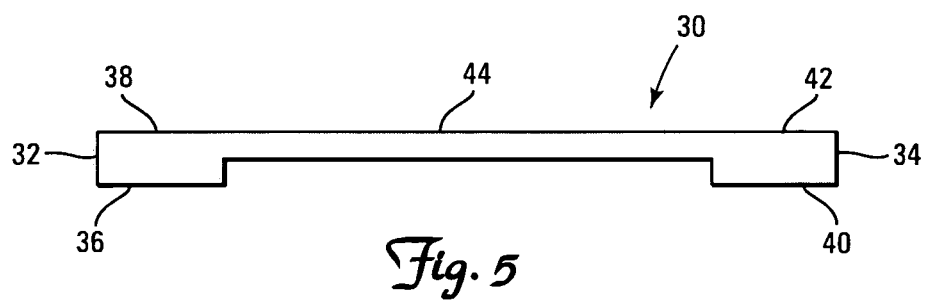
FIG. 5 is an edge view of the magnetically attractable fastening device of FIG. 4.
Figure 6:
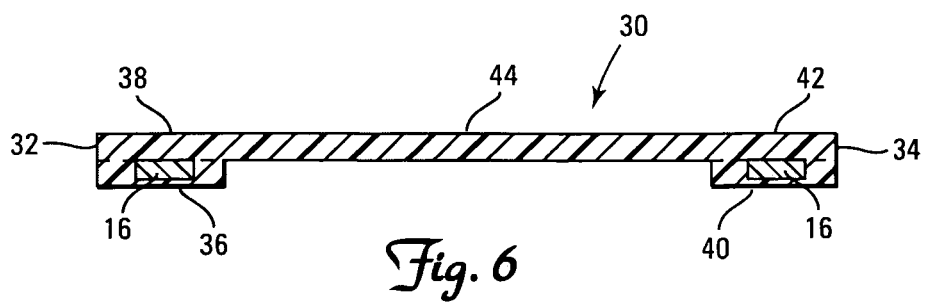
FIG. 6 is a cross-sectional view of the magnetically attractable fastening device of FIG. 5 taken along line 6-6 in FIG. 5.

FIGS. 4-6, show another embodiment of the invention. This embodiment comprises a non-magnetic outer body 30 that has first and second magnetically attractable ends 32 and 34 respectively. Each end 32 and 34 has opposed surfaces 36, 38, 40, and 42. A flexible bridge 44 connects the first and second magnetically attractable ends 32 and 34.

Each of the magnetically attractable ends further comprises a magnetically responsive element 16. Preferably, the elements 16 are hermetically encapsulated within the body 30. In this embodiment, each element 16 is eccentrically positioned within each end 32 and 34. Optionally, the magnetically responsive elements 16 are immovable within ends 32 and 34.

Flexible bridge 44 may be of any length and shape. For example, it may be relatively wide as illustrated in FIGS. 4-6. Alternatively, it may comprise one or more individual strands of material. Additionally, the length of bridge 44 may be short or long depending upon the intended use of the device.

With reference now specifically to FIG. 6, each of the magnetically responsive elements 16 is closer to surfaces 36 and 40 than they are to surfaces 38 and 42. This preferably creates a stronger magnetic filed through surfaces 36 and 40 than through surfaces 38 and 42 and results in a preferential attraction between surfaces 36 and 40. Magnetically attractable elements 16 are encapsulated in body 44 in a manner that when surfaces 36 and 40 are brought into face-to-face proximity, the N pole of one of magnet 36 faces the S pole of the other magnet 40.

As used herein, the following terms have the following meanings:

"Encapsulated" means that the magnetically responsive elements are surrounded on all sides by another material or other materials;

"Hermetically encapsulated" means that the magnetically responsive elements of the safety device are entirely surrounded by a material that renders them impervious to corrosion from ambient moisture;

"Non-magnetic material" means a material that does not respond to a magnetic field and is characterized as having a low magnetic permeability, i.e., it is essentially unaffected by magnetic fields; and "Differential magnetic field" means that the strength of the magnetic field is stronger on through one surface of the magnetically responsive end than it is through an opposed surface of the magnetically responsive end.

The article of the invention may have any shape desired. For example, they may be circular, rectangular, oval, rectangular (including square), etc. Alternatively, they may have an elongate dumbbell shape as shown in FIGS. 4-6. Other shapes are also useful as will be understood by those of skill in the art based upon reading this disclosure.

The material used in the sheath may be selected from any of a variety of materials. Preferably, these materials have a low magnetic permeability so as to minimize the size of the magnetic field around the devices. If desired, the size of a given magnetic field can be adjusted by varying the thickness of the low permeability material around the magnetically responsive elements. It is also preferred that the sheath material be impervious to moisture, that is, that it not absorb moisture. It is also preferred that the sheath material not degrade in the presence of moisture.

Materials useful as the sheath include polymeric materials. Examples of useful polymeric materials include thermoplastic and thermosetting polymers. Examples of useful thermoplastic polymers include, but are not limited to addition polymerized polymers and copolymers. These include polymers and various copolymers of poly(meth)acrylates, polyolefins including polyvinylchloride, plasticized polyvinylchloride, polystyrene, polyisoprene, polytetrafluoroethylene, polyvinylidene fluoride and their perfluorinated and partially fluorinated copolymers with, for example, fluorinated vinyl ethers and acetates (including ethylene vinyl acetate). Useful thermoplastic polymers also include condensation polymerized polymers such as polyamides, polyesters, polyurethanes, polyimides. Still other useful thermoplastic polymers include polyethers (e.g., polypropylene glycol, polyethylene glycol), polyureas and polycarbonate.

Examples of useful thermosetting polymers include epoxides, especially toughened epoxides, crosslinked elastomers (e.g., crosslinked urethanes, crosslinked siloxanes (silicones), crosslinked fluoroelastomers, and crosslinked diene rubbers. The material used as the spacer preferably has a low magnetic permeability and is not susceptible to degradation in water. It may be selected from the same materials used as the body. Additionally, it may comprise a foamed material such as a foamed pressure sensitive adhesive tape.

As previously stated, the sheath material comprises at least one reflective, preferably retroreflective, surface. If desired, both of the outer surfaces of the sheath may be reflective. Retroreflective materials are characterized by the ability to redirect light incident on the material back toward the originating light source.

There are two known types of retroreflective sheeting. They are microsphere-based sheeting and cube corner sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Due to the symmetrical geometry of beaded retroreflectors, microsphere based sheeting exhibits the same total light return regardless of orientation, i.e. when rotated about an axis normal to the surface of the sheeting. Thus, such microsphere-based sheeting has a relatively low sensitivity to the orientation at which the sheeting is placed on a surface. In general, however, such sheeting has lower retroreflective efficiency than cube corner sheeting.

Cube corner retroreflective sheeting typically comprises a thin transparent layer having a substantially planar front surface and a rear structured surface comprising a plurality of geometric structures, some or all of which include three reflective faces configured as a cube corner element.

Retroreflective sheeting is known and is commercially available from, for example, the Reflexite Corporation, Nippon Carbide, and the 3M Company.

The device of the invention may include two magnetically attractable elements, at least one of which comprises a permanent magnet. The other magnetically attractable element may be selected from a material that can be magnetized when brought into proximity to the magnet. Examples of such materials include magnetically soft materials such as iron and nickel. Alternatively, and preferably, the other magnetically attractable element may comprise another permanent magnet.

Permanent magnets useful in the present invention include rare earth magnets, ferrite magnets and alnico magnets. The magnetic field typically produced by rare-earth magnets can be in excess of 1.2 teslas. Ferrite or ceramic magnets typically exhibit fields of 50 to 100 milliteslas.

Rare earth magnets, which are typically made from alloys of rare earth metals, are preferred because of their substantially greater magnetic field. Examples of rare earth magnets useful in the invention include alloys of neodymium and samarium. Neodymium magnets are made of neodymium, iron and boron. Samarium magnets are typically composed of samarium and cobalt. Samarium Cobalt magnets are available in two "series", namely Series 1:5 and Series 2:17. Samarium-cobalt magnets have a relatively high Curie point, which makes them suitable for high-temperature environments.

When joined together without any intervening material (e.g., garment or body material), the magnetically responsive elements typically have a holding power, as measured by the forces required to separate the elements, of from about 1 to 40 lbs. (about 0.4 to 20 kg) of force. Preferably the magnetically responsive elements have a holding power of at least 4 lbs. (about 2 kg).

The invention claimed is:

1. A removable, magnetically repositionable safety device comprising (i) a first magnetically responsive material encapsulated between first and second polymeric sheets thermally bonded to one another to form a first sheath, wherein at least one of the first and second polymeric sheets comprises an outer retroreflective surface, (ii) a second magnetically responsive material encapsulated between third and fourth polymeric sheets thermally bonded to one another to form a second sheath, wherein at least one of the third and fourth polymeric sheets comprise an outer reflective surface, and (iii) a flexible bridge between the first and second sheaths, wherein when the first and second sheaths are magnetically repositionably attached to one another, the outer reflective surface is visible, and wherein the safety device is removably attachable to a substrate.

2. The magnetically repositionable reflective safety device of claim 1, wherein at least one of the magnetically responsive materials is a permanent magnet.

3. The magnetically repositionable reflective safety device of claim 1, wherein each of the magnetically responsive materials is a permanent magnet.

4. The magnetically repositionable reflective safety device of claim 1, wherein the each of the polymeric sheets each comprises a thermoplastic polymer.

5. The magnetically repositionable reflective safety device of claim 1, wherein at least one of the magnetically responsive materials comprises a rare earth magnet.

6. The magnetically repositionable reflective safety device of claim 1, wherein each of the magnetically responsive elements comprises a rare earth magnet.

7. The magnetically repositionable reflective safety device of claim 1, wherein the retroreflective surface is fluorescent.

8. The magnetically repositionable reflective safety device of claim 1, wherein the retroreflective surface comprises a cube corner retroreflective surface.

9. The magnetically repositionable reflective safety device of claim 1, wherein the retroreflective surface comprises a beaded retroreflective surface.

10. The magnetically repositionable reflective safety device of claim 1, wherein the first and second magnetically responsive materials are hermetically sealed within the first and second sheaths.

11. The magnetically repositionable reflective safety device of claim 1, wherein the device is configured to be magnetically repositionably attached to a non-ferromagnetic substrate made of fabric, cloth, film or sheets, with the non-ferromagnetic substrate between the second and the third polymeric sheets.

* * * * *